United States Patent [19]

Davis

[11] Patent Number: 5,010,476
[45] Date of Patent: Apr. 23, 1991

[54] TIME MULTIPLEXED SYSTEM FOR TIGHTLY COUPLING PIPELINED PROCESSORS TO SEPARATE SHARED INSTRUCTION AND DATA STORAGE UNITS

[75] Inventor: Gordon T. Davis, Boca Raton, Fla.

[73] Assignee: International Business Machines Corporation, Armonk, N.Y.

[21] Appl. No.: 876,625

[22] Filed: Jun. 20, 1986

[51] Int. Cl.⁵ .................... G06F 13/14; G06F 13/40; G06F 9/38

[52] U.S. Cl. .................... 364/200; 364/240; 364/240.7; 364/245.5; 364/243; 364/243.3; 364/228.1; 364/231.8; 364/231.4; 364/231.5; 364/229; 364/239.5; 364/964.1; 364/964; 364/964.26; 364/950.3; 364/950; 364/948.3; 364/948.31; 364/931.48; 364/931.4; 364/931.46

[58] Field of Search ............... 370/100, 103, 55, 29, 370/85; 364/200 MS File, 900 MS File

[56] References Cited

U.S. PATENT DOCUMENTS

| | | | |
|---|---|---|---|
| 3,247,488 | 4/1966 | Welsh et al. | 364/200 |
| 3,346,851 | 10/1967 | Thorton et al. | 364/200 |
| 3,566,357 | 2/1971 | Ling | 364/200 |
| 3,774,157 | 11/1973 | Tsui | 340/172.5 |
| 3,813,648 | 5/1974 | Huber | 340/172.5 |
| 3,997,896 | 12/1976 | Cassarino, Jr. | 340/172.5 |
| 4,034,347 | 7/1977 | Probert, Jr. | 364/200 |
| 4,037,204 | 7/1977 | Bennett | 364/200 |
| 4,048,623 | 9/1977 | Gruner | 364/200 |
| 4,100,601 | 7/1978 | Kaufman | 364/200 |
| 4,109,311 | 8/1978 | Blum et al. | 364/200 |
| 4,110,830 | 8/1978 | Krygowski | 364/200 |
| 4,164,787 | 8/1979 | Aranguren | 364/200 |
| 4,245,304 | 1/1981 | Porter | 364/200 |
| 4,349,870 | 9/1982 | Shaw | 364/200 |
| 4,351,025 | 9/1982 | Hall, Jr. | 364/200 |
| 4,354,227 | 10/1982 | Hays, Jr. et al. | 364/200 |
| 4,363,094 | 12/1982 | Kaul et al. | 364/200 |
| 4,371,925 | 2/1983 | Carberry | 364/200 |
| 4,374,418 | 2/1983 | Catiller | 364/200 |
| 4,387,427 | 6/1983 | Cox et al. | 364/200 |
| 4,471,458 | 9/1984 | Weilbacker et al. | 364/200 |
| 4,472,774 | 9/1984 | Pilat et al. | 364/200 |
| 4,479,178 | 10/1984 | Schabowski | 364/200 |
| 4,481,572 | 11/1984 | Ochsner | 364/200 |
| 4,484,273 | 11/1984 | Stiffler | 364/200 |
| 4,503,495 | 3/1985 | Boudreau | 364/200 |
| 4,503,498 | 3/1985 | Antonov | 364/200 |
| 4,523,277 | 6/1985 | Schnathorst | 364/200 |
| 4,574,345 | 3/1986 | Konesky | 364/200 |
| 4,574,373 | 3/1986 | Ahola | 370/55 |
| 4,626,985 | 12/1986 | Briggs | 364/200 |
| 4,630,193 | 12/1986 | Kris | 364/200 |
| 4,698,753 | 10/1987 | Hubbins et al. | 364/200 |
| 4,713,793 | 12/1987 | Conforti | 364/900 |
| 4,714,993 | 12/1987 | Livingston | 364/200 |
| 4,719,568 | 1/1988 | Carruba | 364/200 |
| 4,839,801 | 6/1989 | Nicely | 364/200 |

OTHER PUBLICATIONS

Motorola, "MC68020 32-Bit Microprocessor User's Manual" Prentice-Hall, Englewood Cliffs, NJ, 1985, pp. 1-8, 1-9, 1-10.

Primary Examiner—Archie E. Williams, Jr.
Assistant Examiner—Eric Coleman

[57] ABSTRACT

This invention speeds up the execution of instructions in an information processing system by tightly coupling two or more processors to a random access storage mechanism in such a manner that no arbitration is required and no processor is forced to wait while another processor accesses the storage mechanism. This is accomplished by coupling the processors to the storage mechanism in a time multiplexed manner which enables each processor to have a periodic regularly occurring turn at accessing the storage mechanism.

5 Claims, 4 Drawing Sheets

TIME MULTIPLEXED SYSTEM FOR TIGHTLY COUPLING PIPELINED PROCESSORS TO SEPARATE SHARED INSTRUCTION AND DATA STORAGE UNITS

TECHNICAL FIELD

This invention relates to digital information processing systems and particularly to digital information processing systems which employ two or more digital processors or computers. While not limited thereto, this invention is particularly useful in connection with so-called digital signal processors which process sequences of digital signals obtained by sampling continuous time signals.

BACKGROUND ART

A measure of the power of a digital processor is the number of instructions it can execute per second. The greater the number, the greater is the computational power of the processor. To increase the power of a processor, it is therefore necessary to increase the speed at which it executes instructions. Various methods have been heretofore proposed for doing this. These include the use of instruction decode overlap, the use of multiple processors, and the use of so-called pipelining techniques. These methods are more commonly associated with large-scale processors as opposed to smaller processors like microprocessors.

Assume, for example, that it is desired to design a digital information processing system which uses an existing commercially available microprocessor as the primary processing engine. How would one speed up the execution of instructions in such a system? The parameters and operating characteristics of the microprocessor have already been defined. Is there anything that can be done? One solution would be to employ two or more microprocessors which operate in a parallel manner to simultaneously execute instructions for different ones of the program tasks. In such case, the various microprocessors would need to be able to access the instructions and data contained in the same system storage unit. Unfortunately, this leads to contention problems and requires the use of an arbitration mechanism for deciding which one of the microprocessors is to be given access to the storage unit when two or more of them desire such access at the same time. When such contention occurs, the microprocessor performing one of the program tasks is required to sit and wait and hold up further processing until the other microprocessor completes its accessing of the storage unit. This waiting tends to slow things down. Also, in some applications, particularly real time type applications where program tasks must be performed within a fixed time window, this waiting to obtain access to the storage unit is unacceptable.

SUMMARY OF INVENTION

This invention speeds up the execution of instructions in an information processing system by tightly coupling two or more processors to a storage unit in such a manner that no arbitration is required and no processor is forced to wait while another processor accesses the storage unit. This is accomplished by coupling the processors to the storage mechanism in a time multiplexed manner which enables each processor to have a periodic regularly occurring turn at accessing the storage mechanism. This time multiplexing is preferably performed so that each processor is coupled to the storage mechanism only during those intervals when storage accessing is actually being performed and not during those intervals when the processor is doing something else like decoding an instruction or generating an address. In other words, each processor has certain intervals during which it is performing internal functions and is not actually accessing storage. The time multiplexing is preferably arranged so that one processor is coupled to the storage mechanism for access purposes while another processor is performing its internal functions and vice versa. Thus, each processor has access to the storage when it really needs it and no arbitration among processors is required.

For the case of two processors, for example, their internal operations are synchronized with one another so that they are running 180 degrees out of phase with each other. The two processors are alternately coupled to the storage mechanism during their respective memory access intervals, which memory access intervals are likewise 180 degrees out of phase with each other. Thus, each processor has access to the storage mechanism when it needs it and there is never any contention between the two. The two processors are effectively operating in a simultaneous manner for purposes of executing instructions. Thus, approximately twice as many instructions can be executed in the same period of time and the computing power of the system as a whole is effectively doubled.

It should be noted that this technique cannot be applied to all types of processors. The internal operations of the processors must be capable of being externally synchronized so that the various processors can be made to run in a synchronous manner relative to one another. Nevertheless, for those processors which have this capability, the present technique provides a relatively straightforward and inexpensive method of increasing the processing power of the system.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Figure 1:
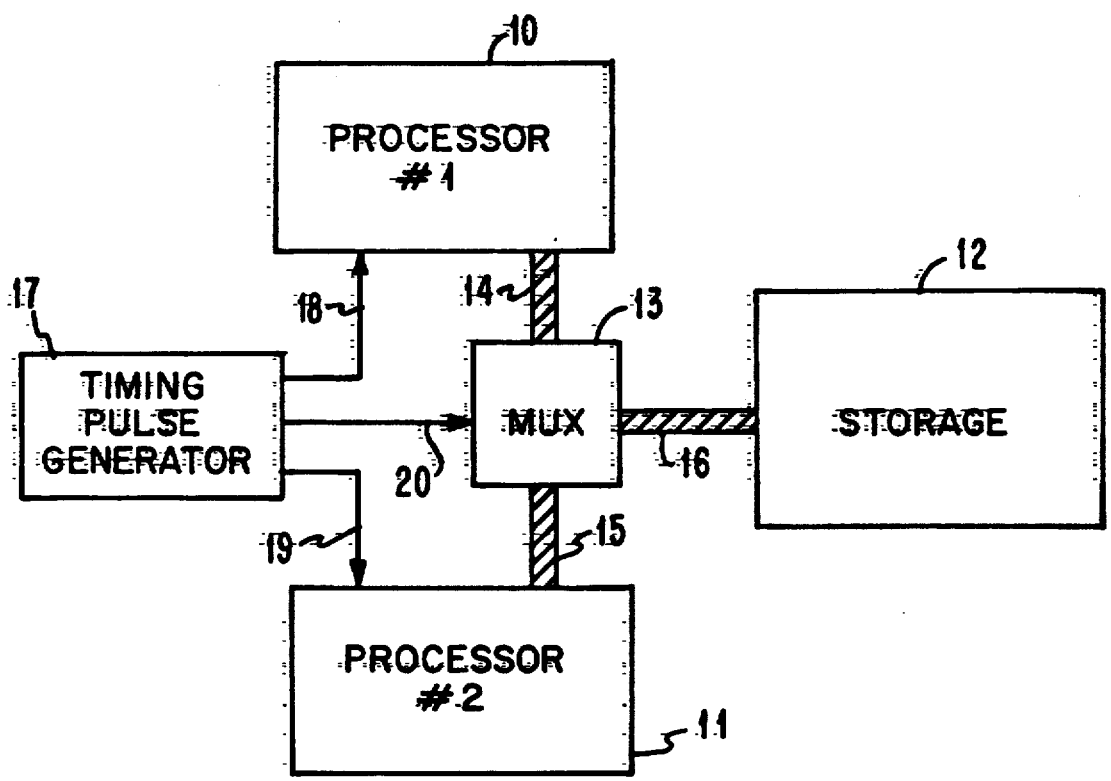
FIG. 1 shows a general block diagram of the basic concept of the present invention.

Referring to FIG. 1, there is shown in a generalized manner the basic features of a digital information processing system constructed in accordance with the present invention. This system includes at least two digital processors 10 and 11 and a random access storage unit or storage mechanism 12. This system also includes multiplexing means represented by a multiplexer (MUX) 13 for coupling the processors 10 and 11 to the storage mechanism 12 in a time multiplexed manner for enabling each processor to have a periodic regularly occurring turn at accessing the storage mechanism 12. The processors 10 and 11 are coupled to the multiplexer 13 by way of processor busses 14 and 15, respectively. The multiplexer 13 is, in turn, coupled to the storage mechanism 12 by way of a storage bus 16. Each of the buses 14, 15 and 16 is a multiconductor bus having a plurality of address lines and a plurality of data lines for transferring, in a parallel manner, multiple-bit address signals and multiple bit data signals between the units connected to the two ends of the bus.

The internal operation of each of the digital processors 10 and 11 is capable of being synchronized by an external source. The system includes means for synchronizing the internal operations of the digital processors 10 and 11 with each other and with the operation of the multiplexer 13. In particular, the synchronizing means includes a timing pulse generator 17 for supplying timing pulses to the digital processors 10 and 11 for controlling the internal operations thereof and for supplying timing pulses to the multiplexer 13 for controlling the multiplexing action thereof.

Multiplexer 13 alternately couples the different ones of the processors 10 and 11 to the storage mechanism 12 in a periodic, regularly occurring manner. In particular, multiplexer 13 connects the individual conductors in bus 14 to the corresponding individual conductors in bus 16 during a first time interval. Thereafter, during the next time interval, multiplexer 13 connects the individual conductors in the bus 15 to the corresponding individual conductors in the storage bus 16. This switching back and forth between busses 14 and 15 is repeated over and over again in a continuing manner to alternately connect the two processor busses 14 and 15 to the storage bus 16.

Processors 10 and 11 are each capable of having the timing of their internal operations controlled from an external source such as the timing pulse generator 17. In particular, timing pulse generator 17 supplies a first set of timing pulses via conductors 18 to the processor 10 and a second set of timing pulses via conductors 19 to the processor 11. These timing pulses are such as to cause the processors 10 and 11 to run 180 degrees out of phase with respect to one another. In particular, the internal timings are controlled so that the time intervals during which the two processors are actually accessing the storage unit 12 are as much different as is possible. There may be some overlap, but there must be substantial periods of non-overlap of the storage accessing phases for the two processors.

Timing pulse generator 17 supplies to the multiplexer 13, via conductors 20, a set of timing pulses for alternating back and forth the connection of the first processor bus 14 and the second processor bus 15 to the storage bus 16. These timing pulses on conductors 20 are selected so that the first processor bus 14 is connected to storage bus 16 during time intervals when the first processor 10 is in its storage accessing phase and so that the second processor bus 15 is coupled to the storage bus 16 when the second processor 11 is in its storage accessing phase. In other words, only one processor at a time is connected to the storage unit 12 and the timing for each processor is such as to afford an adequate accessing of the storage unit 12.

Figure 2:
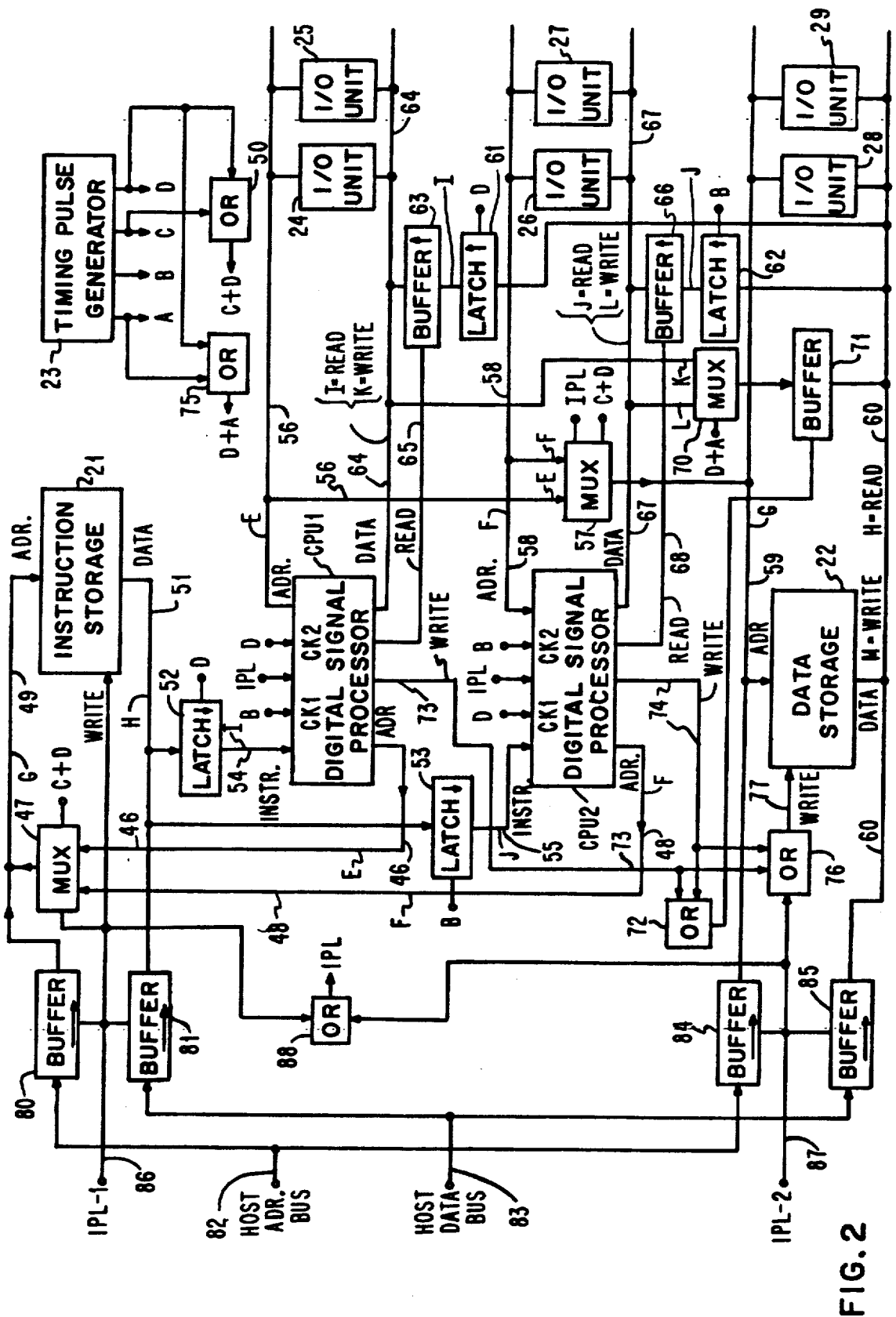
FIG. 2 shows a more detailed block diagram of a specific embodiment of a digital information processing system constructed in accordance with the present invention.

Referring to FIG. 2, there is shown a detailed block diagram of a representative embodiment of a digital information processing system constructed in accordance with the present invention. The system of FIG. 2 includes a first digital processor CPU1 and a second digital processor CPU2. The storage unit in FIG. 2 is comprised of two individual random access storage mechanisms, namely, an instruction storage mechanism 21 for storing processor operating instructions and a data storage mechanism 22 for storing data and other needed information. As will be seen, separate multiplexing mechanisms are provided for the two storage mechanisms.

The system of FIG. 2 further includes a timing pulse generator 23 for supplying the timing pulses which control and synchronize the processor internal operations and the storage multiplexing operations. The FIG. 2 system also includes various input/output (I/O) mechanisms identified as I/O units 24-29. Most of the remainder of what is shown in FIG. 2 represents the multiplexing mechanisms for the two storage mechanisms 21 and 22.

Figure 3:
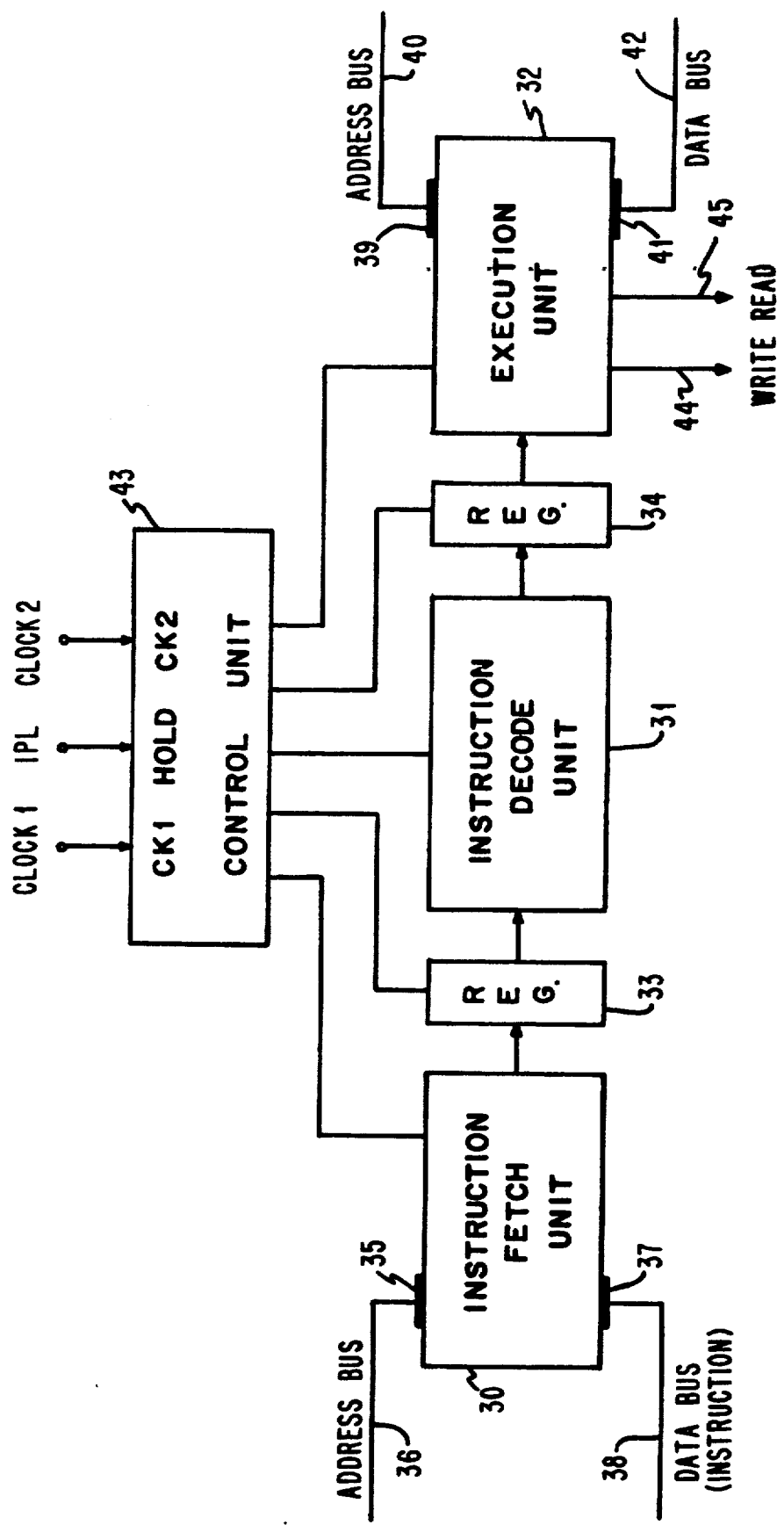
FIG. 3 shows a preferred form of internal construction for each of the digital signal processors of FIG. 2.

Each of the processors CPU1 and CPU2 is a so-called digital signal processor of the type which is typically used to process sequences of digital signals obtained by sampling continuous time signals. These processors CPU1 and CPU2 preferably have the same internal construction and each is preferably a pipelined type of processor. FIG. 3 shows the internal details of a representative pipelined processor which may be used for each of CPU1 and CPU2.

The pipelined processor of FIG. 3 includes an instruction fetching mechanism 30, an instruction decode mechanism 31 and an execution mechanism 32 coupled in cascade by means of multibit registers 33 and 34. The instruction fetching mechanism 30 has an address bus port 35 to which is connected an address bus 36 and a data bus port 37 to which is connected a data bus 38. In a similar manner, the execution mechanism 32 has an address bus port 39, which is connected to an address bus 40, and a data bus port 41, which is connected to a data bus 42. A control unit 43, which is driven by external timing signals called Clock-1 and Clock-2, produces timing signals which are supplied to mechanisms 30-32 for controlling the internal operations thereof. Timing pulses are also supplied to registers 33 and 34 for purposes of moving data from one mechanism to the next. A HOLD input to the control unit 43 is used to temporarily suspend the data processing activities of the mechanisms 30-32. When a high level signal is applied to this HOLD terminal, the processor of FIG. 3 goes into a wait state and its address and data bus ports are placed in a no-signal high-impedance condition.

The instruction fetch mechanism 30 operates to fetch processor operating instructions from a storage mechanism in a sequential or one at a time manner. As such, it includes an address counter which is incremented after each instruction is fetched to point to the next instruction to be fetched. The address in this instruction address counter is periodically placed on the address bus 36 and sent to the external storage mechanism. This accesses from such storage mechanism the desired next operating instruction which is thereupon transferred by way of data bus 38 to the instruction fetch mechanism 30. At the end of the instruction fetching operation, this next instruction is placed in the register 33 for use by the instruction decode mechanism 31.

The instruction decode mechanism 31 decodes the instruction sitting in the register 33 and develops the appropriate information and control signals needed by the execution mechanism 32. It also performs any operand address calculations that may be needed and makes the calculated addresses available to the execution mechanism 32. At the end of the decoding operations for the current instruction, the resulting control signals and calculated addresses are transferred to the register 34 for use by the execution unit 32.

The execution mechanism 32 operates to perform or carry out the instruction which generated the control information then residing in the register 34. If such operation involves a writing of data to a storage unit, then the operand address is placed on the address bus 40, the data to be stored is placed on the data bus 42, and a write control line 44 is activated. If, on the other hand, the operation involves the reading of data, then the operand address is placed on the address bus 40 and a read control line 45 is activated. The execution mechanism 32 then takes in the data accessed from the storage mechanism and appearing on the data bus 42. Some processor operating instructions do not require the movement of data to or from a storage unit. An arithmetic ADD instruction, for example, may cause the adding of two operands which were previously fetched during the execution of earlier instructions. In this regard, the execution unit 32 includes an arithmetic and logic unit, as well as various registers for storing data and addresses.

The thing to note is that, at any given instant, the execution mechanism 32 will be executing instruction N, the instruction decode mechanism 31 will be decoding instruction N+1, and the instruction fetch mechanism 30 will be fetching instruction N+2. This is the origin of the term "pipelining". Three different instructions are in the pipeline and are being simultaneously operated on at any given instant. This overlapped performance of the different tasks involved in carrying out instructions increases the speed at which instructions are executed.

It is assumed herein that each of the digital signal processors CPU1 and CPU2 of FIG. 2 has the internal construction shown in FIG. 3.

Returning to FIG. 2, there will now be considered a first multiplexing mechanism for coupling the processors CPU1 and CPU2 to the instruction storage mechanism 21. This is done in a time multiplexed manner for enabling each processor to have a periodic regularly occurring turn at accessing the instruction storage mechanism 21. Instruction storage 21 contains the processor operating instructions which are fetched by the instruction fetch units in the two processors CPU1 and CPU2.

The instruction fetch address bus port of CPU1 is connected by way of a bus 46 to a first input of a multistage multiplexer 47. The instruction fetch address bus port of CPU2 is connected by a bus 48 to a second input of the multiplexer 47. Multiplexer 47, one at a time and alternately, connects CPU busses 46 and 48 to a storage address bus 49 which runs to the address input of the instruction storage 21.

Figure 4:
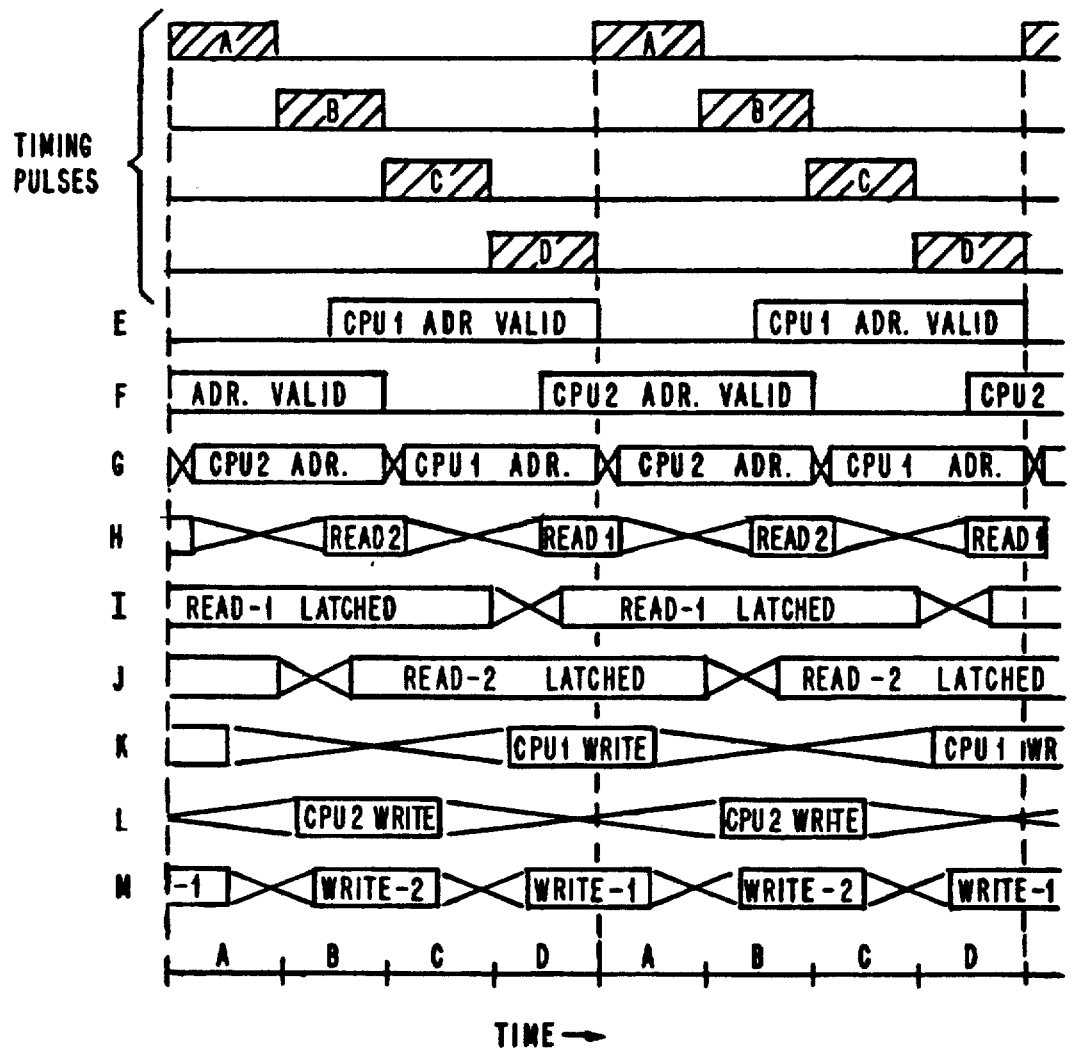
FIG. 4 is a timing diagram used in explaining the operation of the FIG. 2 embodiment.

The pertinent timing is shown in FIG. 4. Waveforms A, B, C, and D represent the timing pulses produced by the timing pulse generator 23. Timing pulses B and D are supplied to the CK1 and CK2 clock pulse inputs of CPU1. For CPU2 the order is reversed, with timing pulses D being supplied to the CK1 input and timing pulses B being supplied to the CK2 input. This reversal causes CPU1 and CPU2 to run 180 degrees out of phase with respect to each other.

Waveforms E and F of FIG. 4 respectively show when valid addresses appear on the CPU1 bus 46 and the CPU2 bus 48. The switching action in the multiplexer 47 is driven by a timewise combination of the C and D timing pulses, which combination is obtained from an OR circuit 50. When C+D is high, CPU1 bus 46 is connected to the storage address bus 49 and, conversely, when C+D is low, CPU2 bus 48 is connected to the storage address bus 49. The resulting action on storage address bus 49 is represented by waveform G of FIG. 4. As there seen, the CPU1 and CPU2 addresses are alternately applied to the address input of the instruction storage mechanism 21.

In response to the CPU1 and CPU2 addresses supplied thereto, the instruction storage mechanism 21 reads out the corresponding data (instructions) at the addressed locations therein. The output of instruction storage 21 is represented by waveform H of FIG. 4, the valid data intervals being represented by the labelled rectangular portions. This output is supplied by way of a bus 51 to the inputs of both a multistage latch mechanism 52 and a multistage latch mechanism 53. Latch mechanisms 52 and 53 are respectively controlled by timing pulses D and B. The outputs of these latch mechanisms are respectively represented by waveforms I and J of FIG. 4.

Latch mechanisms 52 and 53 are assumed herein to be comprised of so-called transparent polarity-hold type latch stages. By this is meant that the appearance of a timing pulse at the latch control terminal enables the latch to start passing data from its input to its output. Then, when the timing pulse terminates, the latch latches up and holds the data present at its input at the moment of termination of the timing pulse. This action is indicated by waveform I for the case of latch 52 which is controlled by the timing pulse D. During the initial portion of timing pulse D, the data appearing at the output of latch 52 is in the process of changing and, for that reason, it is not considered valid. The valid intervals are represented by the labeled rectangular portions of waveform I. Similar considerations apply to the other latch mechanism 53, with the results for latch 53 being indicated by waveform J.

The data (instruction) appearing at the output of latch mechanism 52 is supplied by way of a data bus 54 to the data bus port of the instruction fetch mechanism in CPU1. The data (instruction) appearing at the output of latch mechanism 53 is supplied by way of a data bus 55 to the data bus port of the instruction fetch mechanism in CPU2. In this manner, CPU1 and CPU2 receive their respective operating instructions. As seen from waveforms I and J, the latch mechanisms 52 and 53 make these instructions available to the two CPU's for a substantial interval of time following issuance of the addresses which fetched them.

There will now be considered a second multiplexing mechanism for coupling the processors CPU1 and CPU2 to the data storage mechanism 22. This is done in a time multiplexed manner for enabling each processor to have a periodic regularly occurring turn at accessing the data storage mechanism 22. Data storage 22 contains the current portion of the data being processed and, where appropriate, the intermediate and final results that may be produced for same. Data storage 22 may also contain one or more lookup tables, various parameter values and the like which may be useful in the processing of the data.

The execution unit address bus port of CPU1 is connected by way of an address bus 56 to a first input of a multistage multiplexer 57. The execution unit address bus port of CPU2 is connected by way of a second address bus 58 to a second input of the multiplexer 57. Multiplexer 57, one at a time and alternately, connects CPU address busses 56 and 58 to a storage address bus 59 which runs to the address input of the data storage 22.

The pertinent timing is shown in FIG. 4 and, in the present embodiment, is the same as that shown for the instruction storage mechanism 21. In other words, waveforms E, F, and G also apply to the data storage mechanism 22 and represent the address multiplexing action for this data storage mechanism 22. In particular, waveforms E and F respectively show when valid addresses appear on the CPU1 bus 56 and the CPU2 bus 58. The switching action in multiplexer 57 is driven by a timewise combination of the C and D timing pulses, which combination is obtained from the OR circuit 50. When C+D is high, CPU1 bus 56 is connected to the storage address 59 and, conversely, when C+D is low, CPU2 bus 58 is connected to the storage address bus 59. The resulting action on storage address bus 59 is represented by waveform G of FIG. 4. As there seen, the CPU1 and CPU2 addresses are alternately applied to the address input of the data storage mechanism 22.

Both a reading and a writing mode of operation are provided for the data storage 22. The reading operation is similar to that previously discussed and will be considered first. More particularly, data is read out of the data storage 22 in the manner represented by waveform H. Data storage 22 reads out CPU1 AND CPU2 data in a time interleaved or multiplexed manner, the valid intervals being represented by the labeled rectangular portions. This output data from data storage 22 is supplied by way of a storage data bus 60 to the inputs of both a multistage latch mechanism 61 and a multistage latch mechanism 62. Latch mechanisms 61 and 62 are respectively controlled by timing pulses D and B. The outputs of these latch mechanisms 61 and 62 are respectively represented by waveforms I and J of FIG. 4. Both of these latch mechanisms 61 and 62 are assumed to be of the so-called transparent polarity hold-type. The valid data intervals are represented by the labeled rectangular portions of waveforms I and J. The latch mechanisms 61 and 62 serve to separate out the data portions intended for the different ones of CPU1 and CPU2, the CPU1 data appearing at the output of latch 61 and the CPU2 data appearing at the output of latch 62.

If the execution unit in CPU1 is doing a read operation, then the data in latch 61 is transferred by way of a multistage buffer 63 to a data bus 64 for CPU1. This data bus 64 runs to and is connected to the data bus port of the execution unit in the CPU1. When this execution unit is doing a read operation, a read control line 65 is activated to enable the buffer 63 to pass data to the bus 64. If control line 65 is not activated, then buffer 63 presents a no-signal high-impedance condition to the data bus 64.

In a similar manner, the read latch 62 for CPU2 is coupled by way of a multistage buffer 66 to a data bus 67 which runs to and is connected to the data bus port of the execution unit in the CPU2. If CPU2 is doing a read operation, read control line 68 is activated to enable the buffer 66 to pass data to the CPU2 data bus 67. If control line 68 is not activated, then buffer 66 presents a no-signal high-impedance condition to the CPU2 data bus 67.

Considering now the case of write operations by CPU1 and CPU2, the multiplexed addressing of data storage 22 is the same as before, this being represented by waveform G. In this case, however, the flow of data is in the opposite direction, namely, from the CPU's to the data storage 22. Data from CPU1 is supplied via the CPU1 data bus 64 to the first input of a multistage multiplexer 70. This CPU1 write data is represented by waveform K, the valid intervals being represented by the labeled rectangular portions.

Data from CPU2 is supplied by way of data bus 67 to a second input of the multiplexer 70. This CPU2 write data is represented by waveform L. The valid intervals are represented by the labeled rectangular portions.

A multistage buffer 71 connected to the output of multiplexer 70 is controlled by signals from an OR circuit 72 which receives write signals from write control lines 73 and 74 which are activated when the execution units in the corresponding CPU's are doing write operations. When activated, buffer 71 passes data to the data bus 60 for the data storage 22.

The switching action in the multiplexer 70 is driven by a timewise combination of the D and A timing pulses, which combination is obtained from an OR circuit 75. During write cycles, when D+A is high, the CPU1 data bus 64 is connected to the storage data bus 60 and, conversely, when D+A is low, CPU2 data bus 67 is connected to the data storage data bus 60. The resulting action on data storage data bus 60, when both CPU's are doing write operations, is represented by waveform M of FIG. 4. As there seen, CPU1 and CPU2 data is alternatively applied to the data input of the data storage mechanism 22.

Data storage 22 is conditioned to perform write operations by the same write control signals previously considered. In particular, the CPU1 write control line 73 and the CPU2 write control line 74 are connected to two inputs of an OR circuit 76, the output of which is connected by a control line 77 which runs to the write control terminal of data storage 22. If either CPU write control line is activated, then data storage 22 is conditioned to do a write operation for the corresponding write interval on the data storage data bus 60.

The execution units in the two CPU's need not be doing the same kind of operation at the same time. Thus, the execution unit in CPU1 can be doing a read operation, while the execution unit in CPU2 is doing a write operation and vice versa. The read and write control lines 65, 68, 73 and 74 and the read and write buffers 63, 66 and 67 determine which way the data is moving at any given instant and this direction need not be the same for both CPU's.

The embodiment of FIG. 2 further includes an initial program load (IPL) mechanism for enabling a host processor (not shown) to initially load both the instruction storage mechanism 21 and the data storage mechanism 22. For the case of instruction storage 21, this mechanism includes a multistage buffer 80 for passing addresses to the storage address bus 49 and a multistage buffer 81 for transferring data to the storage data bus 51. The input of buffer 80 is connected to an address bus 82 which is, in turn, coupled to the address bus of a host processor. The second buffer 81 is connected by way of a data bus 83 to the data bus of the host processor.

The IPL operation for data storage 22 is provided by means of a multistage buffer 84 for passing host addresses to the data storage 22 and a multistage buffer 85 for transferring host originated data to the data storage 22. One reason for doing an IPL operation on the data storage 22 would be to load desired lookup tables into such data storage 22.

If the instruction storage 21 is to be IPLed, then the host processor activates an IPL-1 control line 86. This enables the two instruction storage buffers 80 and 81, disables the outputs of address multiplexer 47, and also conditions the instruction storage 21 to do a write operation. If it is desired to IPL the data storage 22, then an IPL-2 control line 87 is activated. This enables the buffers 84 and 85 for the data storage 22 and disables the outputs of address multiplexer 57. It also, via OR circuit 76, conditions the data storage 22 to do a write operation.

In the present embodiment, the initial loading of the instruction storage 21 and the data storage 22 are done separately during different periods of time. This initial loading procedure is not multiplexed on a byte or word basis in this embodiment.

If an IPL operation is being performed on either one of instruction storage 21 or data storage 22, then the two processors CPU1 and CPU2 are temporarily disabled during the IPL operation. This is accomplished by way of an OR circuit 88 which passes either IPL control signal to the HOLD control terminal of both CPU1 and CPU2. This temporarily suspends data processing operations in both CPU1 and CPU2, this being done for the duration of the IPL operation.

While probably desirable in most applications, the use of this IPL feature is optional. For some applications, it may be omitted, in which case the instruction storage 21 could take the form of a read only storage mechanism having the processor operating instructions permanently imbedded therein.

Considering now the I/O units 24-29 of FIG. 2, some of these I/O units can be directly accessed by one of the digital signal processors, some by the other digital signal processor, and some by both digital signal processors. I/O units 24 and 25 are coupled to the execution address and data busses 56 and 64 for CPU1 and, hence, can be directly accessed only by CPU1. I/O units 26 and 27 are coupled to the execution address and data busses 58 and 67 for CPU2 and, hence, can be directly accessed only by the CPU2. I/O units 28 and 29, on the other hand, are coupled to the address and data busses 59 and 60 for the data storage mechanism 22 and, hence, can be directly accessed by both CPU1 and CPU2 via the same multiplexing mechanism as used for the data storage 22. In other words, I/O units 28 and 29 are shared by both of the processors CPU1 and CPU2.

Since two digital signal processors are present, each can do part of the work at hand. For the case of a multichannel communications application, for example, one of the processors can perform the signal processing functions for half of the channels, while the other processor performs the signal processing functions for the other half. Another way of dividing the workload is to have one processor handle the transmitting functions for all channels and to have the other processor handle the receiving functions for all channels. Yet another way of dividing the labor is to have one processor handle the front end modulation/demodulation functions for all channels, with the other processor handling the remainder of the functions, such as scrambling/descrambling, serializing/deserializing and so forth.

As an illustrative example of a particular application, I/O units 24 and 25 might be modem analog-to-digital coverters attached to telephone lines. I/O units 26 and 27 might be modem digital-to-analog converter units associated with the same telephone lines. I/O units 28 and 29 might be interface units for interfacing with a host processor and other database type equipment.

In this example, the digital signal processor CPU2 would provide digitized samples of modem transmitter signals to one or more of the digital-to-analog converters 26 and 27. The digital signal processor CPU1, on the other hand, would obtain digitized samples of received modem signals from the analog-to-digital converter units 24 and 25. Assume, for example, that the host computer wants to communicate with a remote location via a modem. CPU2 would perform the modem transmitter algorithm function and place the output samples in the appropriate one of digital-to-analog converters 26 and 27. CPU1 would extract the incoming digitized data from the appropriate analog-to-digital converter 24 or 25 and convert same from samples of an analog waveform to the actual data sent and supply it to the host computer. When needed, database information may be obtained from a host system by way of one of the I/O units 28 and 29 and, after proper processing, may be supplied to one of the modem units for transmission to a remote location.

As can be seen from the foregoing, the technique described herein enables a synchronous sharing of one or more storage mechanisms by two or more processors without contention and without need for arbitration mechanisms. Each processor is always guaranteed effectively unlimited access to the storage unit or units on a realtime basis. A further advantage is that the different processors can very efficiently and very effectively share the same program subroutines, lookup tables and the like, with only one copy of each item being provided in the storage mechanism. Also, the use of pipelined processors and separate instruction storage and data storage mechanisms further increases the speed and efficiency and, hence, the data processing power of the system as a whole.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A digital information processing system comprising:
   at least two digital processors;
   an instruction storage mechanism for storing processor operating instructions;
   a first multiplexing mechanism for coupling the processors to the instruction storage mechanism in a time multiplexed manner for enabling each processor to have a periodic regularly occurring turn at accessing the instruction storage mechanism;
   a separate data storage mechanism for storing data separate from said mechanism for storing processor operating instructions;
   and a second multiplexing mechanism for coupling the processors to the data storage mechanism in a time multiplexed manner for enabling each processor to have a periodic regularly occurring turn at accessing the data storage mechanism;

each digital processor being a pipelined processor having an instruction fetching mechanism, an instruction decode mechanism and an execution mechanism;

each digital processor having an address bus port and a data bus port for the instruction fetching mechanism;

each digital processor having an address bus port and a data bus port for the execution mechanism;

the first multiplexing mechanism including means for coupling the address bus ports and the data bus ports for the instruction fetching mechanisms to the instruction storage mechanism so that each instruction fetching mechanism is given a periodic regularly occurring turn for purposes of accessing the instruction storage mechanism;

and the second multiplexing mechanism includes means for coupling the address bus ports and the data bus ports for the execution mechanisms to the data storage mechanism so that each execution mechanism is given a periodic regularly occurring turn for purposes of accessing the data storage mechanism.

2. The system as defined in claim 1 wherein the instruction fetching mechanism, instruction decoding mechanism and said execution mechanism are coupled in a cascade manner.

3. The system as defined in claim 1 wherein the address bus port and data bus port for the instruction fetching mechanism are physically discrete ports.

4. The system as defined in claim 1 wherein the address bus port and the data bus port for the execution mechanism are physically discrete ports.

5. The system as defined in claim 1 further characterized by:

first latch means in said data bus means to store data received from said data storage means for supplying said data one of said processors, to thereby release said data storage means for a subsequent function while the data is held for use in said one processor; and a second latch means in said instruction bus means to store instructions received from said instruction storage means for supplying said instructions to one of said processors to thereby release said instruction storage means for a subsequent function while the instructions are held for use in said one processor.

* * * * *